May 19, 1953     J. SUNNEN     2,638,721
BALANCING DEVICE FOR HIGH-SPEED HONING MACHINES
Filed Jan. 6, 1950     2 Sheets-Sheet 1
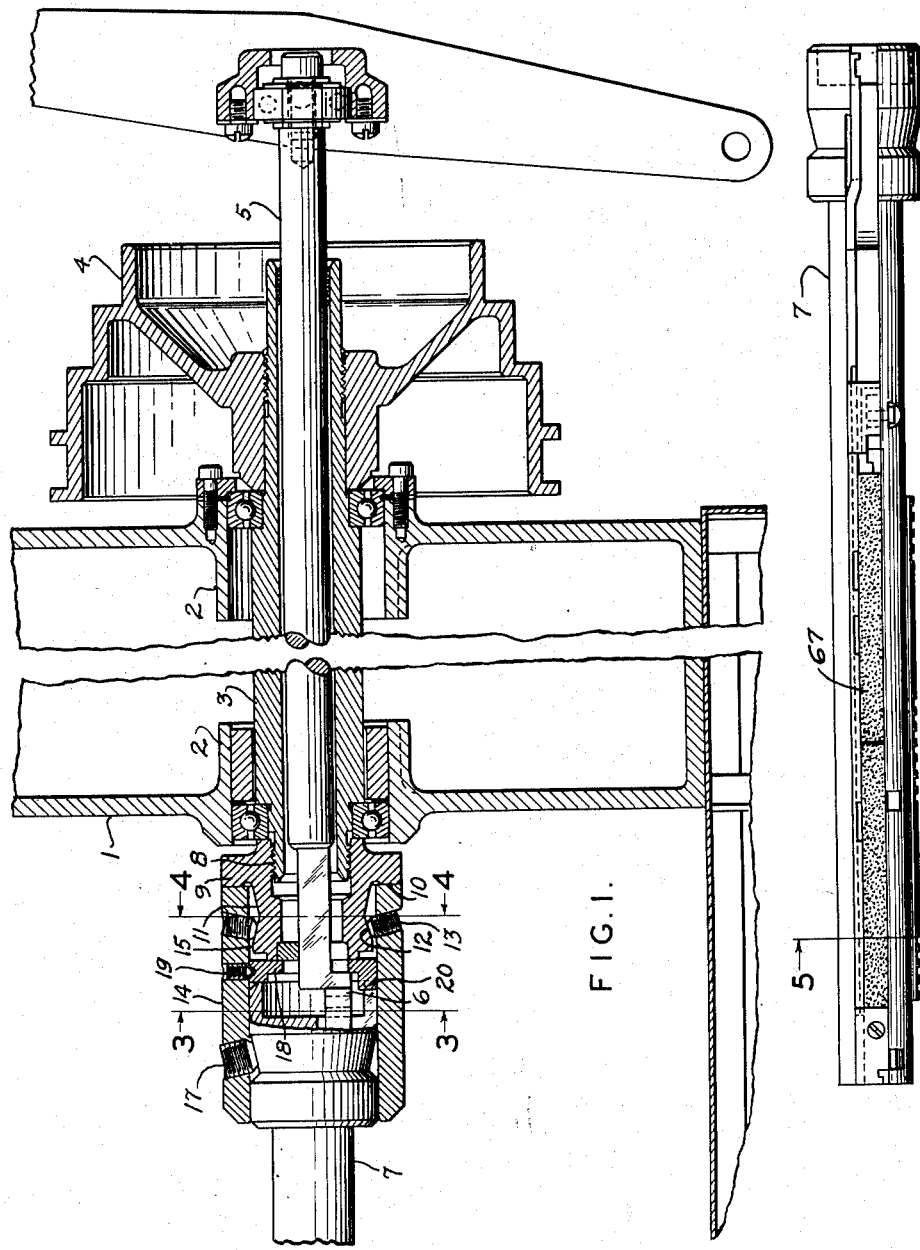
*INVENTOR.*
JOSEPH SUNNEN
BY
ATTORNEY May 19, 1953  J. SUNNEN  2,638,721
BALANCING DEVICE FOR HIGH-SPEED HONING MACHINES
Filed Jan. 6, 1950  2 Sheets-Sheet 2

*INVENTOR.*
JOSEPH SUNNEN
BY
ATTORNEY

Patented May 19, 1953

2,638,721

UNITED STATES PATENT OFFICE 2,638,721

BALANCING DEVICE FOR HIGH-SPEED HONING MACHINES

Joseph Sunnen, Clayton, Mo.

Application January 6, 1950, Serial No. 137,123

4 Claims. (Cl. 51—169)

This invention relates to high speed honing machines, and more particularly to adjustable spindle mounts or chucks for adjusting or correcting the eccentricity of the spindles of such machines, where the accuracy of the work may be impaired by the hone carrying spindle being out of balance, or out of center. Since the optimum cutting speed of a hone is measured in feet per minute, and not in revolutions per minute, machine operated internal honing devices are operated at speeds which are increased as the diameter of the holes being finished is reduced. Where the hole diameter is in the order of one-half inch or less, the desired operating speed is so great as to set up undesirable vibrations unless the hone carrying spindle is dynamically balanced. At the same time, space limitations inherent in small hone sizes make it very difficult to obtain a balanced condition for an adjustable hone except at a particular point in the range of adjustment.

In small honing spindles, a single adjustable hone is frequently used in combination with a non-adjustable guide diametrically opposed to the hone. This results in an eccentric relation of the hone arbor to the hole which is being finished, and in order to avoid the undesirable vibration of the work due to the resulting violent gyration of the work, it has previously been necessary to slow the hone speed down far below the optimum cutting speed.

An object of this invention is to provide means for dynamically balancing machine operated hone spindles.

Another object of this invention is to provide a mount or chuck for hone spindles having means for adjusting the concentricity of the spindle so as to cause the working surfaces of the hone and guide to rotate in the same circle.

Other objects and advantages will appear from the following description and the accompanying drawings, in which like reference numerals refer to corresponding parts.

Figure 1 shows a somewhat diagrammatic sectional elevation of essential parts of a honing machine having my invention applied thereto.

Fig. 2 is a side view of a typical hone arbor of the type adapted for use with my invention.

Figure 3:
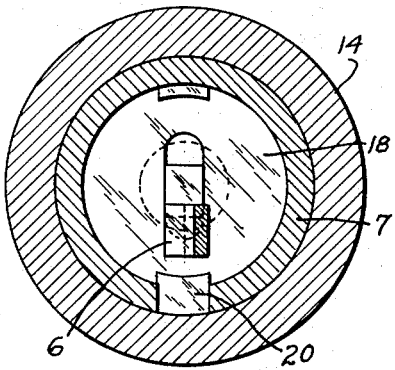
Fig. 3 is a sectional view taken along the line 3—3 of Fig. 1 looking in the direction of the arrows.
Figure 5:
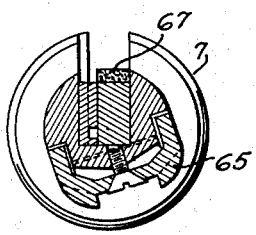
Fig. 5 is an end view of the mandrel with the hone in retracted position.
Figure 4:
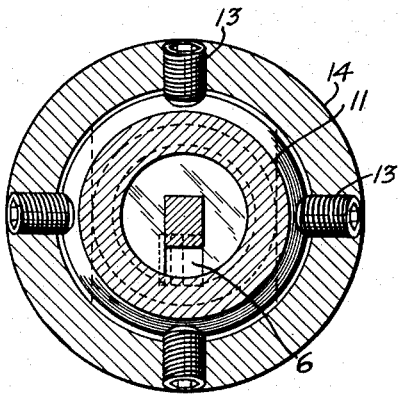
Fig. 4 is a sectional elevation taken along the lines 4—4 of Fig. 1 looking in the direction of the arrows.
Figure 6:
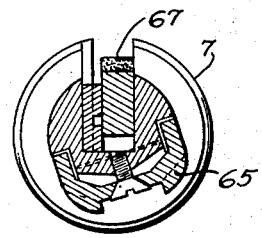
Fig. 6 is an end view of the mandrel with the hone in expanded position.

The reference numeral 1 shows the frame of a typical high speed honing machine which may be of the type shown in my Patent No. 2,377,588 from which more complete details may be obtained, if desired. The machine is provided with bearings 2 carrying a hollow main spindle 3 driven by a pulley 4. A feed rod 5 extends through the hollow spindle and is provided with a connection 6 to couple it to the hone arbor 7 which may be of the type shown in either of my Patents Nos. 2,376,850 and 2,376,851, to which reference may be had for further details. It should be noted that the use of the invention is not confined to any particular type of hone arbor and these examples are cited merely for illustration. The operating end of the spindle is provided with external screw threads, as illustrated at 8, to receive the spindle nose 9.

The spindle nose 9 comprises a hollow member threaded to the main spindle at 8 and provided with a ground, flat shoulder 10 adjacent to an annular external groove or a recess portion 11. This recessed portion 11 has a conical or tapered section 12, the smaller end of the taper being adjacent the ground shoulder 10 so that the screws 13 carried by the chuck 14 will firmly hold the end of the chuck in place against the shoulder 10.

The chuck 14 comprises a tubular member having a bore slightly larger than the enlarged portion 15 of the spindle nose 9 so as to leave a substantial amount of loose play for adjustment by means of the screws 13 which are threaded into the chuck 14 at an angle as indicated. By adjustment of the screws 13, the mounting of the mandrel can be adjusted eccentrically in order to make up for the eccentricity of the hone and guide caused by adjustment of the feed rod. The chuck 14 is adapted to receive the end of the mandrel or hone arbor 7 and a screw 17 is threaded into the chuck 14 at an angle so as to hold the hone arbor 7 in position. The chuck also carries a drive plate 18 held in position by screw 19 and provided with a lug 20 to engage and drive the hone arbor 7.

The hone arbor used in the machine may be of any suitable type, but for illustration, attention is called to that shown in my Patent No. 2,377,588 and particularly in Figs. 2 and 8-11, inclusive, thereof. Also, see my Patents Nos. 2,376,850 and 2,376,851 for more complete details. It will be noted that by adjustment of the feed rod 5 corresponding to rod 69 of Patent No. 2,377,588, the hone member 67 of the present device is moved outwardly, while the guide surface or wear plate 65 opposite to the hone remains in its original position. If the mandrel is fitted into a hole with the hone in cutting position, it will naturally tend to cause a gyration of the work resulting in loss in efficiency and accuracy of hone operation. By adjustment with the screws 13 the operator is enabled to adjust the eccentricity of the mandrel or hone arbor 7 so that the wear plate 65 lies just as far from the center as does the hone surface so that they turn in the same circle with no resultant gyration of the work.

I claim:

1. In a honing machine including a housing, a main spindle extending outwardly from the housing, a spindle nose connected at one end to said main spindle and having its outer free end portion formed with an annular recess tapering outwardly away from the wall of the housing, a shoulder formed at the inner end portion of said spindle nose, said shoulder being formed with a flat ground outer face lying at right angles to the axis of said spindle, a sleeve loosely positioned on said spindle nose and having its inner end adapted to abut the flat ground face of said shoulder, a plurality of adjusting screws carried by said sleeve, said screws being adapted to be adjusted to engage said annular wall to position the sleeve with respect to said spindle, said screws extending through said sleeve at substantially a 90° angle with respect to said tapered annular wall.

2. The structure of claim 1 characterized in that a removable connection is arranged at the outer free end portion of said spindle nose and within said sleeve for locking said sleeve to a driven member.

3. In an arbor chuck for use on a driven spindle mounted in bearings, said spindle having a threaded end portion, a spindle nose extension threaded onto the end of the spindle and including an annular flange having an outwardly facing flat face lying in a plane at right angles to the axis of the spindle, and a forwardly projecting annular portion, a chuck sleeve having an internal diameter greater than the diameter of the spindle extension and adapted to enclose said projecting portion and to be readily adjusted thereabout, said sleeve having a flat face normally abutting the flat side face of said extension, the projecting portion of said spindle extension being formed with an annular recess defined in part by a conical portion with its diameter decreasing toward the flat face of said flange, a plurality of spaced screws threaded through said sleeve at such an angle as to have their axes intersect outwardly of said shoulder and adapted to engage said conical portion of said extension to concentrically adjust said sleeve with respect to the axis of the spindle and simultaneously urge the inner flat end of the sleeve into engagement with the flat face of said shoulder, means for securing an arbor in the outer end portion of said sleeve, and means in said sleeve between the extension and the arbor for locking said arbor against rotation in said sleeve.

4. In a honing machine, a hollow main driving spindle, chuck means associated with said spindle, said chuck means including an extension fixed to the end of said spindle, and a tubular member arranged about said extension and radially spaced from the extension, a hone arbor fixed in the tubular member against axial movement, a radially adjustable hone carried by the hone arbor, a feed rod extending through said spindle and said extension to adjust the radial position of the hone in said arbor, said extension being formed with an annular recess defined in part by an outwardly diverging tapered wall portion, screws extending through the tubular member and engaging said tapered portion to position the tubular member radially with respect to the extension to compensate for the adjustment of said radially adjustable hone, and means for securing said hone arbor against relative rotary movement with respect to said tubular member, said means being positioned between said extension and the adjacent end of said arbor.

JOSEPH SUNNEN.

References Cited in the file of this patent

UNITED STATES PATENTS

| Number | Name | Date |
|---|---|---|
| 1,023,513 | Gonard | Apr. 16, 1912 |
| 1,407,663 | McCallum | Feb. 21, 1922 |
| 1,511,529 | Standlee | Oct. 14, 1924 |
| 1,533,875 | McCleary | Apr. 14, 1925 |
| 1,940,455 | Kilpela | Dec. 19, 1933 |
| 2,070,381 | Sunnen | Feb. 9, 1937 |
| 2,092,116 | Hansen | Sept. 7, 1937 |
| 2,449,277 | Cherry | Sept. 14, 1948 |
| 2,461,436 | Offen | Feb. 8, 1949 |